(12) United States Patent
Aoki et al.

(10) Patent No.: US 7,924,850 B2
(45) Date of Patent: Apr. 12, 2011

(54) SYSTEM AND METHOD FOR MANAGING AND CONTROLLING COMMUNICATIONS PERFORMED BY A COMPUTER TERMINAL CONNECTED TO A NETWORK

(75) Inventors: Kentaro Aoki, Sagamihara (JP);
Yukinobu Moriya, Tokyo (JP);
Katsuhiko Shimada, Yamato (JP);
Naoto Shimizu, Yokohama (JP); Hideki Sugiyama, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 11/860,758

(22) Filed: Sep. 25, 2007

(65) Prior Publication Data

US 2008/0084820 A1 Apr. 10, 2008

(30) Foreign Application Priority Data

Oct. 4, 2006 (JP) .................................. 2006-273261

(51) Int. Cl.
*H04L 12/28* (2006.01)
(52) U.S. Cl. ..................... 370/395.54; 710/316; 379/242
(58) Field of Classification Search ............. 370/395.54; 726/14, 4, 10; 709/230; 713/182
See application file for complete search history.

(56) References Cited

U.S. PATENT DOCUMENTS

| 2006/0259775 | A2* | 11/2006 | Oliphant ........................ 713/182 |
| 2007/0157306 | A1* | 7/2007 | Elrod et al. ...................... 726/14 |
| 2007/0192500 | A1* | 8/2007 | Lum .............................. 709/230 |
| 2008/0040785 | A1* | 2/2008 | Shimada .......................... 726/10 |
| 2008/0276304 | A1* | 11/2008 | Maffione et al. ................... 726/4 |

FOREIGN PATENT DOCUMENTS

| JP | 2003-348128 | 12/2003 |
| JP | 2005-333200 | 12/2005 |
| JP | 2006-074705 | 3/2006 |
| WO | 2006/059572 A1 | 8/2006 |

OTHER PUBLICATIONS

JPO, Information Materials for IDS, Japanese Office Action date Apr. 15, 2008.
"Measures to be Taken Against Winny, Method of Mirage", http://web.archive.org/web/2006081392052, untranslated version, Aug. 13, 2006.

* cited by examiner

*Primary Examiner* — Dang T Ton
*Assistant Examiner* — Lionel Preval
(74) *Attorney, Agent, or Firm* — Shimokaji & Associates, P.C.

(57) ABSTRACT

The present invention provides a system which maintains a function of monitoring and controlling a network regardless of an increase of data to be downloaded by a computer whose access to the network is restricted. The system includes: a first interface for transmitting and receiving data to and from the network; a second interface for transmitting and receiving data to and from the network; a determination component for determining whether or not network data received by the first interface is from a first terminal device; a first creation component for creating, in response to a determination made by the determination component that the network data is transmitted from the first terminal device, information causing a transmission destination address of the network data to be changed to an address of the second interface in a table of the first terminal device; a first transmission component for transmitting the information causing the transmission destination address to be changed to the address of the second interface; and a restriction component for restricting a bandwidth of the network data passing through the second interface to a predetermined value.

3 Claims, 8 Drawing Sheets

SYSTEM AND METHOD FOR MANAGING AND CONTROLLING COMMUNICATIONS PERFORMED BY A COMPUTER TERMINAL CONNECTED TO A NETWORK

BACKGROUND OF THE INVENTION

1. Field of the Invention

The present invention relates to a technique for monitoring and controlling communications performed by a computer terminal or the like connected to a network.

2. Related Art

Recently, access from an unauthorized computer to an intranet or the like of a corporation or the like has been prohibited in order to prevent information leakage and proliferation of computer viruses. In addition, access to the intranet from a computer without anti virus software installed thereon is also restricted. For example, when a computer not having regular authorization is connected to a network, all the packet data transmitted from the computer is blocked in the network to prevent access from the computer. In addition, when a computer, which does not have anti-virus software installed thereon, or which does not have the latest virus pattern file applied thereto, is connected to the network, the computer is only allowed to be connected to a server related to the anti-virus software, and only allowed to download the virus pattern file. In this case, access from the computer to the network resources other than the server is prohibited. Moreover, when a computer which does not have the latest patch applied to its operating system (OS) is connected to the network, and if that is detected, then access to the network resources from the computer is also prohibited except for the purpose of downloading the patch.

In Japanese Patent Application Laid-open Publication No. 2006-74705, disclosed is a technique for controlling access to a network from a computer connected to the network, as follows. Specifically, packet data transmitted from the computer is monitored, and when it is determined that communications to be performed by the computer must be restricted, address resolution protocol (ARP) information (an ARP request or an ARP reply) is transmitted to the computer in order for the computer to rewrite its own ARP table, and the packet data from the computer is directed to the address indicated by the ARP information. As a result, the access from the computer to the network is prohibited. In addition, by selectively allowing the packet data from the computer to pass through the network, the access to the network is restricted in this technique.

However, when the amount of a virus pattern file increases, or when the amount of download data of a patch transmitted from the computer whose access to the network is restricted by use of ARP information increases, the monitoring of packet data from other computers connected to the network becomes difficult. However, when a restriction is imposed on access from a computer to the network, and also when the amount of data downloaded by the computer for obtaining virus pattern files and/or patch files for an OS is increased, the monitoring of packet data from other computers connected to the network becomes difficult. Specifically, in order to detect an unauthorized computer, it is necessary to capture packet data (particularly, an ARP request) transmitted from the computer. However, as the amount of download data increases, the probability of the occurrence of an error in capturing packet data becomes higher. Moreover, the transmission of data or the like for controlling connections other than the connection for this purpose becomes difficult. The increase in the amount of download data is more likely to cause an error in capturing packet data, and also makes it difficult to transmit data or the like for controlling connections from computers other than this computer. Accordingly, there is a concern that a functional failure may occur as to the management and the controlling of communications performed by computer terminals connected to the network. Furthermore, as Gigabit Ethernet support has become a standard feature on client computers, and network bandwidth is expected to increase, this functional failure is expected to become more notable.

SUMMARY OF THE INVENTION

The present invention provides a system which maintains functions of monitoring and controlling a network regardless of an increase in data to be downloaded by a computer whose access to the network is restricted.

In the present invention, there is provided a system for controlling access to a network from a computer terminal. The system includes: a first interface for transmitting and receiving data to and from the network; a second interface for transmitting and receiving data to and from the network; a determination component for determining whether or not network data received by the first interface is from a first terminal device; a first creation component for creating information causing a change to a transmission destination address of the network data in a table of the first terminal device to an address of the second interface, in response to a determination made by the determination component that the network data is transmitted by the first terminal device; a first transmission component for transmitting the information causing the change to the transmission destination address to the address of the second interface; and a restriction component for restricting a bandwidth of the network data passing through the second interface to a predetermined value.

According to the system, the network is monitored by the first interface, and the bandwidth for downloading a security patch is controlled by the second interface. In this manner, a function of controlling access from a PC terminal to the network is not damaged.

The present invention further provides a method of controlling access to a network from a computer terminal, comprising: capturing network data by a first interface; determining whether or not the captured data is transmitted from a first terminal device; transmitting information causing a transmission destination address of the network data to be changed to an address of a second interface in a table of the first terminal device, in response to a determination that the network data is transmitted from the first terminal device; and restricting a bandwidth of network data passing through the second interface to a predetermined value.

The present invention further provides a program product stored on a computer readable medium, which when executed, controls access to a network from a computer terminal, the computer readable medium comprising program code for: capturing network data by a first interface; determining whether or not the captured data is transmitted from a first terminal device; transmitting information causing a transmission destination address of the network data to be changed to an address of a second interface in a table of the first terminal device, in response to a determination that the network data is transmitted from the first terminal device; and restricting a bandwidth of network data passing through the second interface to a predetermined value

BRIEF DESCRIPTION OF THE DRAWINGS

These and other features of the present invention will be more readily understood from the following detailed description taken in conjunction with the accompanying drawings.

FIG. 2 shows an example of an illustrative network environment in which the network quarantine system which controls a network connection of a terminal device is connected in an unauthorized manner or the like.

FIGS. 7A to 7C exemplify connection modes of a network quarantine system and a circuit for management or the like.

DETAILED DESCRIPTION OF THE INVENTION

Figure 1:
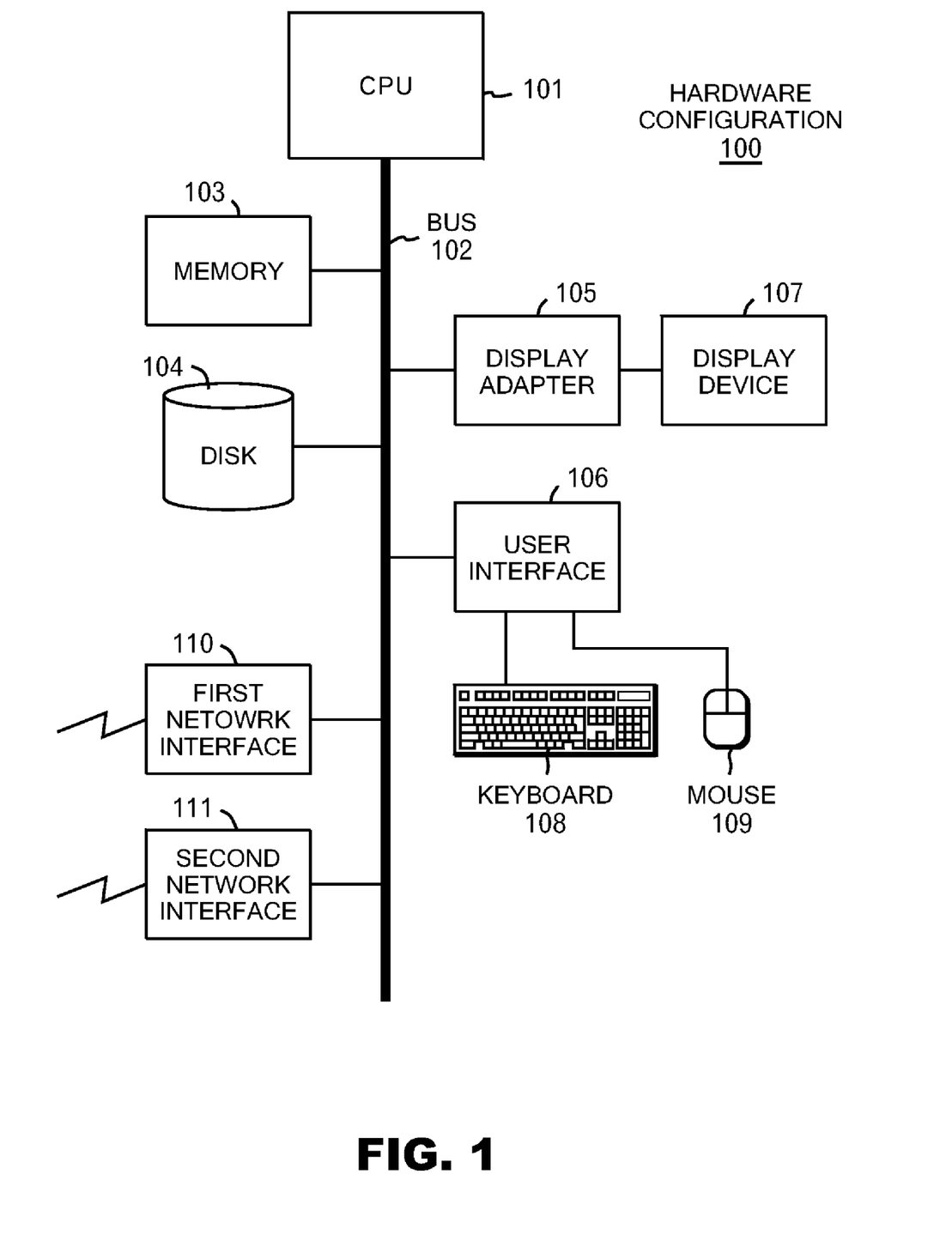
FIG. 1 shows an outline of an illustrative hardware configuration related to a network quarantine system.

FIG. 1 exemplifies an outline of a hardware configuration 100 related to a network quarantine system which controls a network connection of a terminal device connected in an unauthorized manner. This control is performed by detecting and monitoring a terminal device such as a computer connected to a network in an unauthorized manner. A CPU 101, which is a central processing unit, executes various programs under the control of an operating system of various kinds. The CPU 101 is mutually connected to a memory 103, a disk 104, a display adapter 105, and a user interface 106 via a bus 102.

A disk 104 includes software, an operating system required for the computer to function, and a program or the like used for executing the present invention. These programs are read into a memory, and are executed by the CPU when needed. Data, such as network data (packets) captured by monitoring, and network addresses or the like of computer terminals or the like which have received regular authentication are stored in the disk 104. It should be noted that a flash memory or the like can be substituted for the disk 104, and it is obvious to those skilled in the art that any recordable medium will suffice for the disk 104, and that the disk 104 is not limited to a hard disk.

The system of the present invention is connected to a display device 107 via the display adapter 105; to a keyboard 108 and a mouse 109 via the user interface 106; and to a network via network interfaces 110 and 111. This system is operated by means of the keyboard 108 and the mouse 109, and intermediate statuses and results of processing are displayed on the display device 107. Network cards or the like are connected to the first and second interfaces 110 and 111. Basically, the network data is obtained and transmitted via the first network interface 110. The bandwidth is restricted by the second network interface 111. A switching HUB or the like is connected to the first and second network interfaces 110 and 111.

In some cases, the present invention may be implemented in a distributed environment via a network. Note that this hardware configuration 100 is only an exemplification of one embodiment of a computer system, a bus arrangement, and a network connection. The features of the present invention can be realized in any one of various system configurations, in a form provided with a plurality of identical configuration elements, or in a form further distributed over the network.

Figure 2:
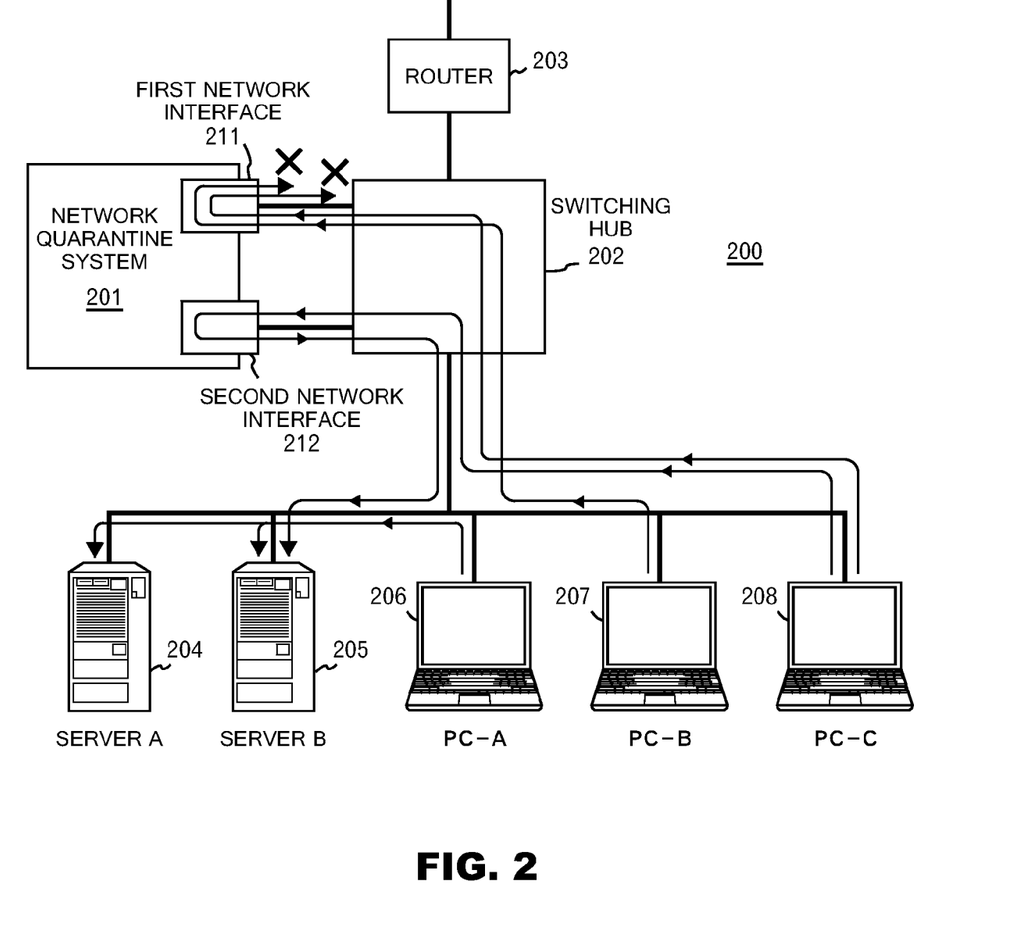

FIG. 2 is an example of a network environment where the network quarantine system operates to control a network connection of a terminal device connected in an unauthorized manner or the like. A network quarantine system 201 is connected to a switching HUB 202 via first and second network interfaces 211 and 212. A router 203 exists in the upper layer of the switching HUB 202. The network quarantine system 201 exists in each network segment. The purpose of this is to control a destination of data by broadcasting data. For example, when a destination of data can be controlled by a method other than the aforementioned method, it is not limited to this connection configuration. Servers A 204 and B 205, and PCs A 206, B 207 and C 208 are connected to this network segment. It is assumed that the server A 204 is the server used for general operations, and the server B 205 is the server from which a security patch is to be downloaded.

Here, an assumption is made that it is confirmed that the PC-A 206 is a terminal device, which does not have any problem with security settings, which has received regular connection authentication, and which is provided with anti-virus software or the like. The PC-A 206 can be connected to the server A 204 as well as the server B 205 in the network. On the other hand, when the PC-B 207 is determined to be a PC terminal connected in an unauthorized manner without receiving regular authentication, the network quarantine system 201 directs data from the PC-B 207 or data from another network device to flow into the network quarantine system 201. Thus, the data is blocked so as not to be transmitted to another server or terminal device. Normally, this blocking of data is performed by the first network interface 211. In addition, when the PC-C 208 has received regular authentication, but does not have sufficient security settings, then the PC-C 208 is determined to be a PC terminal in violation of security settings in such a case where the pattern file of the anti-virus software is not updated to the latest one, for example. In this case, the network quarantine system 201 controls the PC-C 208 so that the PC-C 208 can be connected only to the server B 205, which provides the security patch or the pattern file. The data between the PC-C 208 and a server for downloading a security patch is controlled by directing the data to be transmitted via the second network interface 212.

Figure 3:
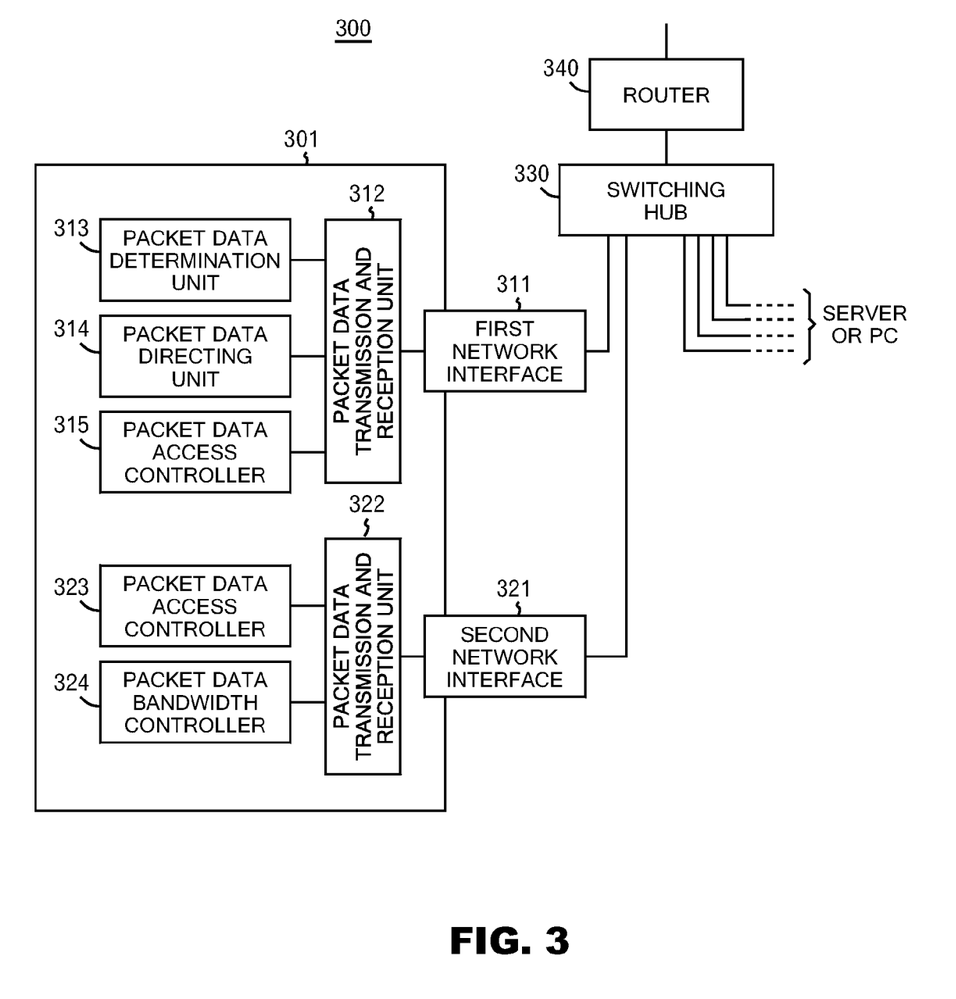
FIG. 3 exemplifies an outline of an illustrative functional configuration of the network quarantine system.

FIG. 3 exemplifies an outline of a functional configuration of a network quarantine system 301. The network quarantine system 301 is connected to a switching HUB 330 via interfaces 311 and 321.

For example, a packet transmission and reception unit 312 captures, and then, transmits packet data via the interfaces 311 and 321. The packet transmission and reception unit 312 may be a function of the network stack of an operating system (OS). A packet determination unit 313 monitors the network by determining whether or not a PC terminal whose security settings is sufficient, or an unauthorized computer terminal is connected to the network. This determination is based on the packet data captured by the packet transmission and reception unit 312. This monitoring is performed by detecting an ARP packet transmitted by broadcasting from a PC terminal connected in an unauthorized manner, a non-ARP packet from a PC connected in an unauthorized manner, or a packet from a PC terminal in violation of security settings, and thereby a determination is made to monitor the network.

When a packet data directing unit 314 detects an ARP packet from a PC terminal in violation of security settings (first terminal device), or a PC terminal connected in an unauthorized manner (second terminal device), the data directing unit 314 creates ARP information including a forged connection destination to redirect the packet data. In this way, the PC terminal connected in an unauthorized manner or the PC terminal in violation of security settings is not connected to another server, or PC terminal. This forged ARP information is transmitted by the packet data transmission and reception unit 312. It should be noted that it is possible to capture all the packets when such a repeater HUB or highly functional HUB including a mirroring function is used, in addition to capturing an ARP packet. Thus, it is possible to detect a PC terminal connected in an unauthorized manner or a PC terminal in violation of security settings from a non-ARP packet.

As to the forged ARP information, for example, a media access control address (MAC address) corresponding to an internet protocol (IP) address of each server, or of each PC terminal is forged to be the MAC address of the first network interface 311 or the second network interface 321. In addition, a server or a PC terminal of the connection destination is prevented from directly communicating with a PC terminal connected in an unauthorized manner or a PC terminal in violation of security settings preferably by transmitting the forged ARP information in order to set the MAC address of the PC terminal connected in an unauthorized manner, or of the PC terminal in violation of security settings in the ARP table of the server or the PC terminal of the connection destination to the MAC address of the network quarantine system.

Incidentally, in the case of packet data related to a PC terminal connected in an unauthorized manner, the packet data is directed to the first network interface 311. Moreover, in the case of packet data related to a PC terminal in violation of security settings, the packet data regarding communications with the server B 205 (FIG. 2) is preferably directed to the second network interface 321, and the packet data other than that is preferably directed to the first network interface 311. The reason for using the separate interfaces of the destinations to which packet data is directed is to surely detect packet data from a PC terminal connected in an unauthorized manner, and then to block the packet data when a PC terminal in violation of security settings downloads a security patch via the second network interface 321. However, when it is not necessary to detect and block all of the packets from the PC terminal connected in an unauthorized manner, the packet data may be directed to the second network interface 321. In addition, the forged APR information is transmitted to the server or PC terminal which becomes the communications counterpart of the PC terminal connected in an unauthorized manner, or of the PC terminal in violation of security settings.

When a detected packet is a non-ARP packet from a PC terminal connected in an unauthorized manner or is a packet having a destination other than the server for downloading a security patch, the packet being transmitted from a PC in violation of settings, a packet data access controller 315 blocks the connection to the network by discarding the packet data. It should be noted that when the detected packet is a packet having a destination other than the server for downloading a security patch, the packet being transmitted from a PC terminal in violation of security settings, the packet data access controller 315 redirects the packet data to a Web server or the like for displaying a warning indicating that the security settings are not sufficient.

A packet transmission and reception unit 322 captures or transmits packet data via the second network interface 321. The packet transmission and reception unit 322 includes functions similar to those of the packet data transmission and reception unit 312.

A packet data access controller 323 restricts access to a server or a PC terminal in the network when a PC terminal in violation of security settings is to be connected to the server or the PC terminal in the network for the purpose of downloading a security patch. In other words, the packet data access controller 323 restricts access to a server or a PC terminal in the network when the PC terminal in violation of security settings is to be connected to the server or the PC terminal in the network for a purpose other than modifying the violation of security settings. The restrictions include the discarding of all the packet data, or the redirecting of the packet data to a Web server or the like for displaying a warning indicating that the security settings are not sufficient.

A packet data bandwidth controller 324 is configured to restrict a bandwidth when a security patch is downloaded to a PC terminal in violation of security settings, and then the amount of data flow increases, so that there arises a concern that the bandwidth in the network is occupied. Such a restriction can be realized by rewriting the ARP table of the server distributing a security patch as well.

Figure 4:
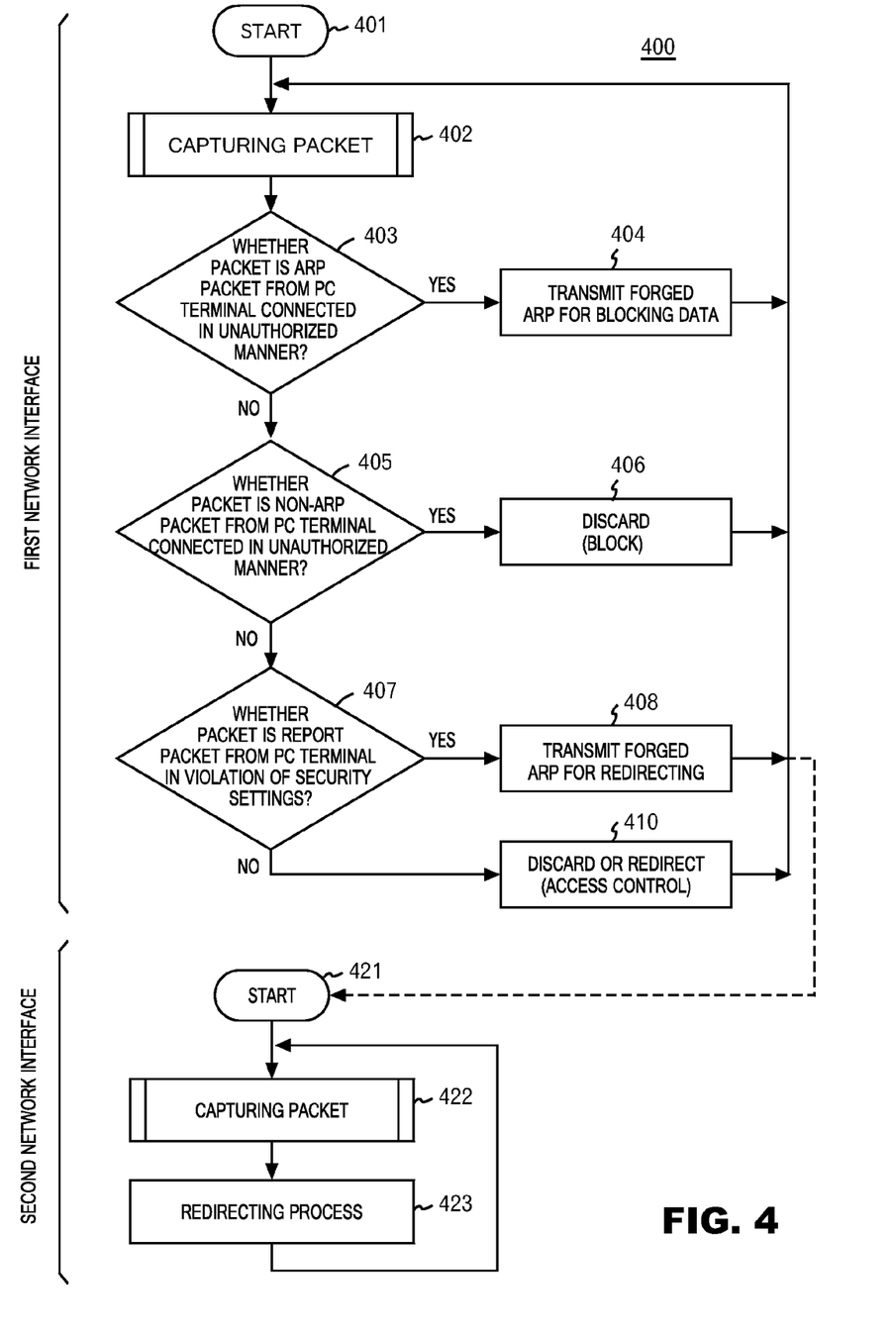
FIG. 4 is an exemplary flow chart in which the network quarantine system processes packet data of a PC terminal connected in an unauthorized manner, or a PC terminal in violation of security settings.

FIG. 4 exemplifies a flow 400 in which the network quarantine system processes packet data of a PC terminal connected in an unauthorized manner or a PC terminal in violation of security settings. The process flow is separated into the first network interface and the second network interface to a large extent. The process flow 400 begins with 401. In 402, packet data is captured. In 403, it is determined whether or not the captured packet data is an ARP packet requesting a MAC address of a server or a PC terminal of the connection destination from a PC terminal connected in an unauthorized manner. Normally, such an APR packet is to be transmitted in the network at the time of the initial connection by broadcasting or the like. In 403, when the packet is determined to be an ARP packet from a PC terminal connected in an unauthorized manner (YES), the process proceeds to 404. The determination whether or not it is a PC terminal connected in an unauthorized manner can be made on the basis of the transmission source MAC address of the packet data, for example.

In 404, forged ARP information is transmitted for blocking communications related to the PC terminal connected in an unauthorized manner. This forged ARP information is information for rewriting the ARP table of the PC terminal connected in an unauthorized manner, and the ARP table of a server or a PC terminal which communicates with the PC terminal connected in an unauthorized manner. As to the content of the ARP table to be rewritten, in the case of the ARP table of the PC terminal connected in an unauthorized manner, for example, the MAC address in the table is changed to the MAC address of the first network interface of the network quarantine system so that the PC terminal connected in an unauthorized manner cannot transmit packet data directly to a server or another PC terminal or the like. In the case of the ARP table of a sever or a different PC terminal which communicates with the PC terminal connected in an unauthorized manner, the MAC address of the PC terminal connected in an unauthorized manner in the table is changed to the MAC address of the first network interface of the network quarantine system so that the server or the different PC terminal cannot transmit packet data directly to the PC terminal connected in an unauthorized manner. The process returns to 402 for processing the next packet data after 404.

In 403, when the packet data is determined to be not an ARP packet from a PC terminal connected in an unauthorized manner (NO), the process proceeds to 405. In 405, it is determined whether or not the captured packet data is a normal packet from a PC terminal connected in an unauthorized manner, that is, whether or not the captured data is a non-ARP packet. In 405, when the captured packet is determined to be a non-ARP packet from a PC terminal connected in an unauthorized manner (YES), the packet data is discarded in 406. Thereafter, the process returns to 402 for processing the next packet data.

In 405, when the captured packet data is determined to be not a non-ARP packet from a PC terminal connected in an unauthorized manner (NO), the process proceeds to 407. In 407, it is determined whether or not the captured packet data is a report packet from a PC terminal in violation of security settings. This report packet is a packet used when an agent-like program notifies the network quarantine system of a violation in security settings in a PC terminal in a case where there is a violation in security settings in a PC terminal. It is also possible to employ a configuration in which whether or not a PC terminal is in violation of security settings is determined from the access history to the server for downloading a security patch instead of causing the agent to operate in a PC terminal. However, in order to check the security settings including detailed settings while increasing accuracy, the report is preferably received with a report packet by use of an agent program which can actually check the settings or the like in the PC terminal. In 407, when the captured packet data is determined to be a report packet from a PC terminal in violation of security settings (YES), the process proceeds to 408.

In 408, forged ARP information is transmitted for controlling communications related to the PC terminal in violation of security settings. This forged ARP information is information for rewriting the ARP table of a server or a PC terminal which communicates with the PC terminal in violation of security settings. As to the content to be rewritten, in a case of the ARP table of the PC terminal in violation of security settings, for example, the MAC address of the server for downloading a security patch in the table is changed to the second network interface of the network quarantine system, and the other MAC addresses are changed to the first network interface of the network quarantine system so that the PC terminal in violation of security settings cannot transmit the packet data directly to a server or a different PC terminal.

In a case of the server for downloading a security patch, which communicates with a PC terminal in violation of security settings, the MAC address of the PC terminal in violation of security settings in the ARP table is changed to the second network interface of the network quarantine system so that it becomes easier to restrict the bandwidth of download data such as a security patch in the second network interface. Furthermore, in a case of a different server or a PC terminal, the MAC address of the PC terminal in violation of security settings in the ARP table is changed to the first network interface of the network quarantine system so that the different server or PC terminal cannot transmit the packet data directly to the PC terminal in violation of security settings.

In 408, since the ARP table is forged so that the PC terminal in violation of security setting and the server for downloading a security patch communicate with each other via the second network interface, a redirecting process begins in the second network interface. As a result, the process proceeds to 421, and the redirecting process is performed in the second network interface in parallel to the first network interface. After 408, the process returns to 402 for processing the next packet data.

In 407, when the captured packet data is determined to be not a report packet from a PC terminal in violation of security settings (NO), the process proceeds to 410. In 410, the packet data of the PC terminal in violation of security settings is discarded as it is, or the packet data is redirected to a Web server for displaying a warning indicating that the PC terminal is in violation of security settings as needed. Thereafter, the process returns to 402 for processing the next packet.

The processing in the second network interface begins in 421. In 422, a packet is captured. In 423, the packet is retransmitted for redirecting to the server or the PC terminal. It should be noted that viewing from the load on the network, the bandwidth may be restricted as needed. The details of the processing flow in the second network interface will be described later.

It should be noted that although packet data other than the packet data expressed in FIG. 4 is also received, the received packet data is processed in accordance with normal protocol rules. For example, when the network quarantine system is remotely controlled, the packet data for the control is processed in the network quarantine system in accordance with a normal process.

Figure 5:
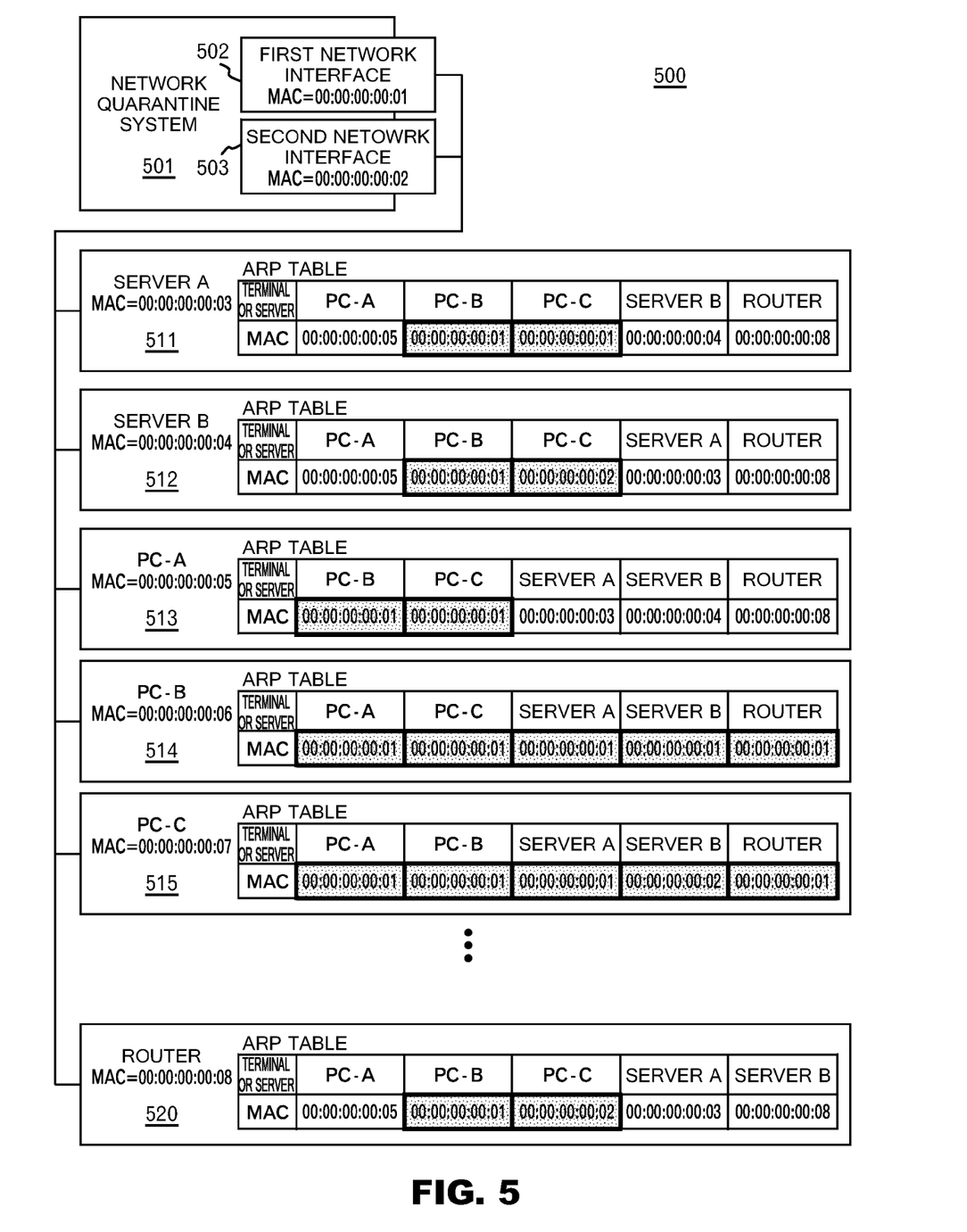
FIG. 5 exemplifies ARP tables included in servers or PC terminals, in the network.

FIG. 5 exemplifies an ARP table included in a server or a PC terminal in the network. Here, since a PC terminal or the like does not need to have MAC addresses corresponding to all of the devices in the network in the ARP table, it is obvious to those skilled in the art that FIG. 5 is only one aspect of the example. In FIG. 5, it is assumed that a PC-B is a PC terminal connected in an unauthorized manner, and a PC-C is a PC terminal in violation of security settings. In addition, it is assumed that a server B is a server for downloading a security patch. The MAC addresses indicated by thick lines in the ARP tables in FIG. 5 are MAC addresses which have been rewritten. Specifically, these MAC addresses are forged ones using forged ARP information. The MAC address of the first network interface is 00:00:00:01. The MAC address of the second network interface is 00:00:00:02. The MAC address of the server A is 00:00:00:03. The MAC address of the server B is 00:00:00:04. The MAC address of the PC-A is 00:00:00:05. The MAC address of the PC-B is 00:00:00:06. The MAC address of the PC-C is 00:00:00:07.

For example, both of the MAC addresses of the PC-B, and PC-C are rewritten and replaced with the MAC addresses of the first network interface. With this rewriting process, the packet data addressed to the PC-B and PC-C is transmitted from the server A to the first network interface of the network quarantine system. Moreover, the MAC addresses of all the devices in the network including the server A in the APR table of the PC-B which is the PC terminal connected in an unauthorized manner are rewritten and replaced with the MAC addresses of the first network interface. Thereby, packet data from the PC-B cannot be transmitted directly to all the devices on the network.

The MAC address of the PC-B in the ARP table of the server B which is the server for downloading a security patch is rewritten and replaced with the MAC address of the first network interface. The MAC address of the PC-C which is the PC terminal in violation of security settings is also rewritten and replaced with the MAC address of the second network interface. Moreover, in the ARP table of the PC-C, the MAC address of the server B is rewritten and replaced with the MAC address of the second network interface. With such a rewriting process, communications to be performed by the PC-B for downloading a security patch is restricted to the second network interface, and thus, the bandwidth can be easily restricted.

In the ARP table of the router, the MAC address of the PC-B which is the PC terminal connected in an unauthorized manner is rewritten and replaced with the MAC address of the first network interface so that the packet data cannot be transmitted from the router directly to the PC-B. Likewise, the MAC address of the router in the ARP table of the PC-B is rewritten and replaced with the MAC address of the first network interface so that the packet data cannot be transmitted from the PC-B directly to the router. In addition, the MAC address of the PC-C which is the PC terminal in violation of security settings in the ARP table of the router is rewritten and replaced with the MAC address of the second network interface. Such a rewriting process is performed when the server for downloading a security patch exists only outside this sub-network. When the server for downloading a security patch exists only inside the sub-network, the MAC address of the PC-C in the ARP table of the router is rewritten and replaced with the MAC address of the first network interface in order that the packet data of the PC-C cannot be transmitted to the outside of the sub-network.

Figure 6:
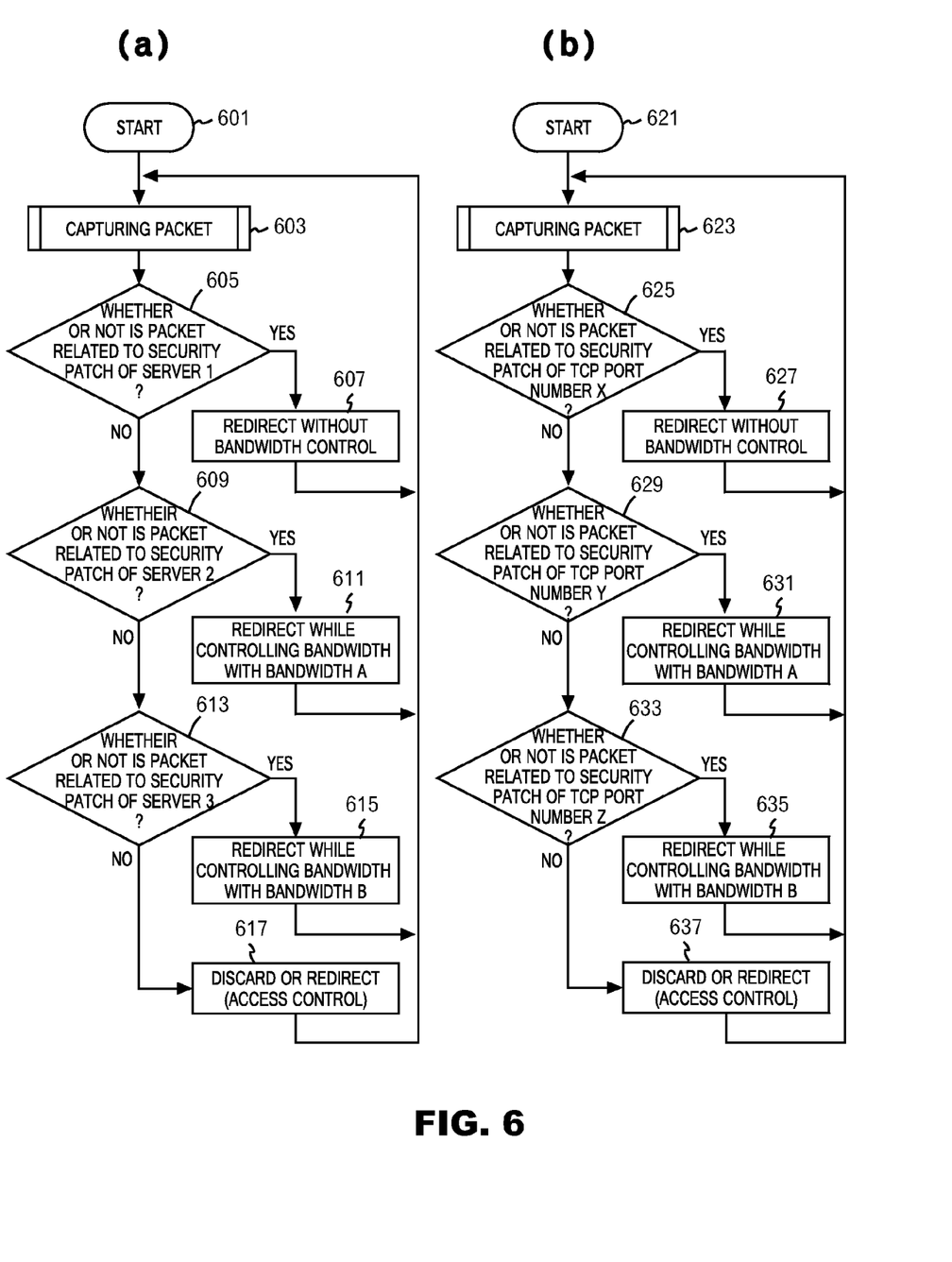
FIGS. 6A and 6B are exemplary flow charts of bandwidth control.

FIG. 6, comprising FIGS. 6a and 6b, exemplifies a process flow for controlling a bandwidth as to the amount of flow of packet data at the second network interface when there exit multiple servers each for downloading a security patch or the like. FIG. 6 is provided for the purpose of explaining the process flow of the second network interface as shown in FIG. 4 in further detail. FIG. 6A shows an example of a bandwidth control process for packets for each of the servers. The process begins with 601. In 603, a packet is captured. In 605, it is determined whether or not the captured packet is a packet related to a security patch. In 605, when the packet is determined to be a packet related to a security patch of a server 1 (YES), the process proceeds to 607, and the packet data is redirected without bandwidth control. Here, the bandwidth control is not performed in such a case where a security patch with a high priority is distributed by the server 1, for example. Thereafter, the process returns to 603 for processing the next packet.

In 605, when the packet is determined to be not a packet related to the security patch of the server 1 (NO), the process proceeds to 609. In 609, it is determined whether or not the captured packet is a packet related to a security patch of a server 2. In 609, when the packet is determined to be a packet related to the security patch of the server 2 (YES), the process proceeds to 611, and then, the packet data of the security patch is redirected while controlling the bandwidth with a bandwidth A. Thereafter, the process returns to 603 for processing the next packet.

In 609, when the packet is determined to be not a packet related to the security patch of the server 2 (NO), the process proceeds to 613. In 613, it is determined whether or not the captured packet is a packet related to a security patch of a server 3.

In 613, when the packet is determined to be a packet related to the security patch of the server 3, the process proceeds to 615. In 615, the packet data is redirected while controlling the bandwidth with a bandwidth B. Thereafter, the process returns to 603 to process the next packet.

In 613, when the packet is determined to be not a packet related to the security patch of the server 3 (NO), the process proceeds to 617. In 617, since the packet data is not related to the security patch, the packet may be discarded, or the packet data may be redirected to a Web server which issues a warning indicating that the packet is from the PC terminal in violation of security settings as needed.

In the determination boxes of 605, 609, and 613, it is not limited to make determinations on packet data from a server, and packet data to the server. In other words, it is not limited to make determinations on the packet data in both directions. However, it is preferable to make determinations on packet data in both directions. This is because that the APR tables of both the server and the PC terminal in violation of security settings are forged. Discarding or redirecting packet data is preferably performed in the direction of the packet to and from the server as appropriate.

FIG. 6B shows an example of a bandwidth control of each port number. Here, the process is similar to that as shown in FIG. 6A except that the process of bandwidth control varies depending on the determination of a port number.

The process begins with 621. In 623, a packet is captured. In 625, it is determined whether or not the captured packet is a packet related to a security patch of a TCP port. In 625, when the packet is determined to be a packet related to a security patch of a TCP port number X (YES), the process proceeds to 627, and the packet data is redirected without bandwidth control. Thereafter, the process returns to 623 for processing the next packet.

In 625, when the packet is determined to be not a packet related to the security patch of TCP port number X (NO), the process proceeds to 629. In 629, it is determined whether or not the captured packet is a packet related to a security patch of a TCP port number Y. In 629, when the packet is determined to be a packet related to the security patch of the TCP port number Y (YES), the process proceeds to 631, and then, the packet data of the security patch is redirected while controlling the bandwidth with a bandwidth A. Thereafter, the process returns to 623 for processing the next packet.

In 629, when the packet is determined to be not a packet related to the security patch of the TCP port number Y (NO), the process proceeds to 633. In 633, it is determined whether or not the captured packet is a packet related to a security patch of a TCP port number Z.

In 633, when the packet is determined to be a packet related to the security patch of the TCP port number Z (YES), the process proceeds to 635. In 635, the packet data is redirected while controlling the bandwidth with a bandwidth B. Thereafter, the process returns to 623 to process the next packet.

In 633, when the packet is determined to be not a packet related to the security patch of the TCP port number Z (NO), the process proceeds to 637. In 637, since the packet data is not related to the security patch, the packet may be discarded, or the packet data may be redirected to a Web server which issues a warning indicating that the packet is from the PC terminal in violation of security settings as needed.

Furthermore, it is needless to say that it is obvious to those skilled in the art that a bandwidth control for a combination of both a server and a port number can be easily performed by use of this process as shown in FIGS. 6A and 6B.

Figure 7:
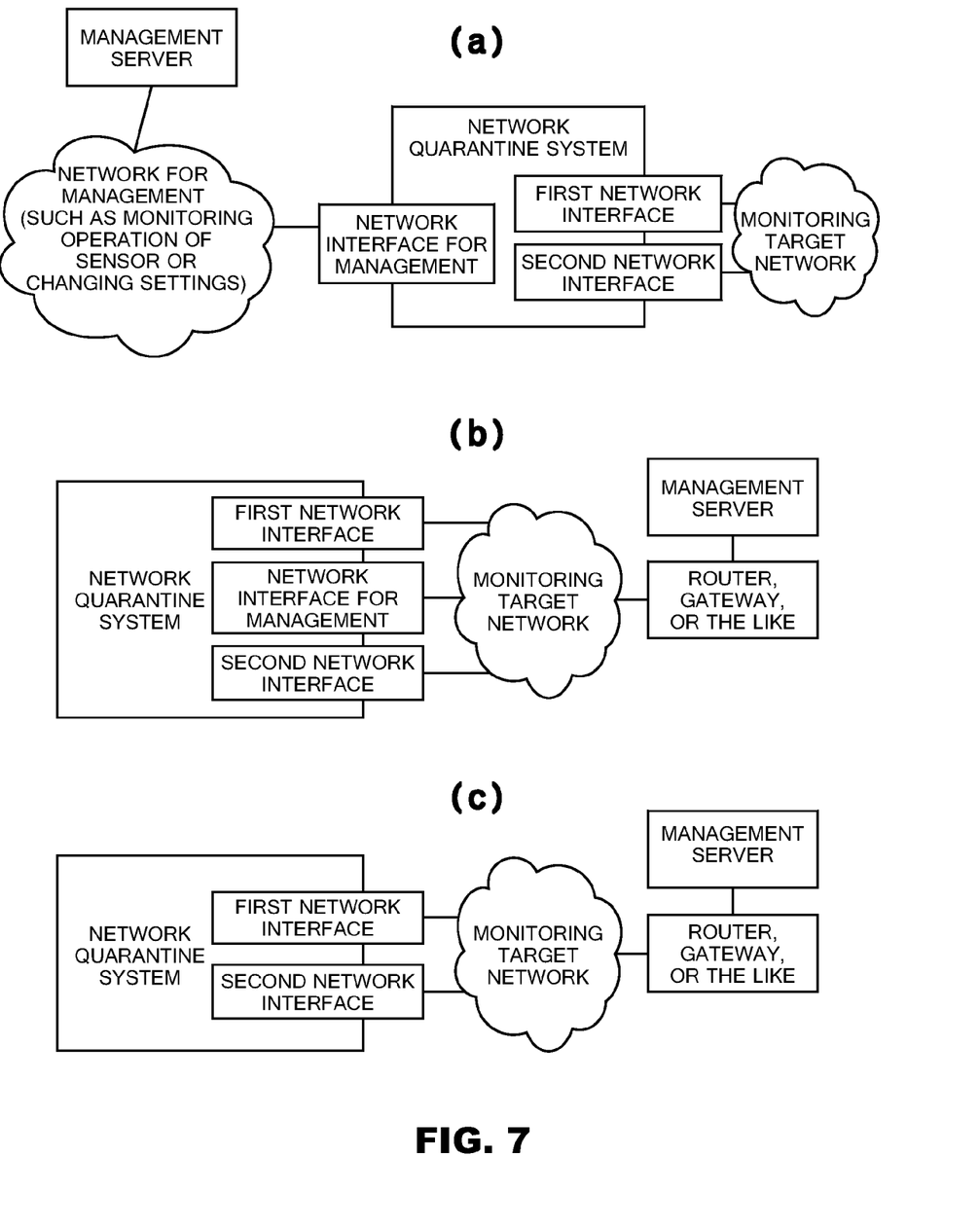

FIGS. 7A to 7C exemplify connection modes of a network quarantine system and a circuit for management or the like. In the current situation, since data transmission of an ARP packet or the like by broadcasting is limited within the sub-network, the network quarantine system needs to be arranged for each sub-network. In a large intranet of a large corporation, there exist a number of sub-networks. Thus, the number of network quarantine systems becomes greater as the number of sub-networks becomes greater. In such a case, the network quarantine systems need to be effectively managed, and the connection to the circuit for management becomes one of the important points.

FIG. 7A shows a connection mode in which a network quarantine system is connected to a management server via a network interface for management. Since the management network is separated from the normal network which is used by a PC terminal or the like, no mistakes are made in monitoring packet data or obtaining management data even when data for management is mixed into the redirecting process. Thus, it is supposed to have fewer problems in terms of security. The network quarantine system transmits packet data for management via the network interface for management.

FIG. 7B shows a connection mode in which a network quarantine system is connected to a management server via a network interface for management. However, in this connection mode, the network itself is connected to the same network as that of a PC terminal or the like. This is for the purpose of securing the transmission and reception of data by the network interface for management when it is difficult to provide a new network circuit. Thus, the possibility that the data becomes unmanageable is lowered even when data is mixed into the monitoring or redirecting process.

FIG. 7C shows a connection mode in which the first network is used for both the network interface for management and the interface for monitoring the network. In this connection mode, the possibility of missing a data packet for management is lowered even when the packet is mixed into security patch data.

As has been described so far, according to the present invention, a bandwidth for downloading a security patch or the like can be controlled while the influence on the transmission and reception of data for monitoring the network is kept at minimum. This control is performed by directing packets separately to the network interface for monitoring the network, and to the network interface which controls the bandwidth for downloading a security patch or the like.

Figure 8:
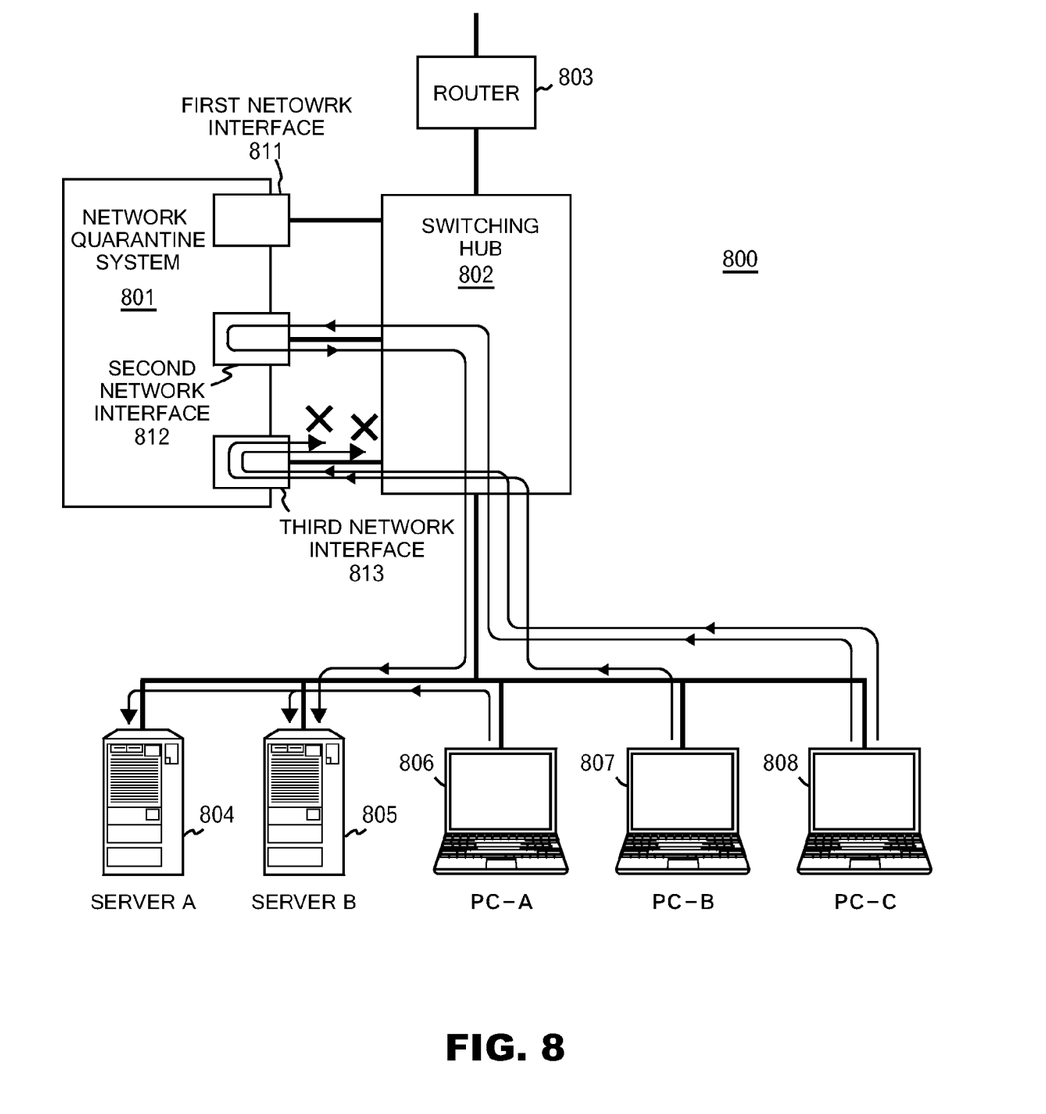
FIG. 8 exemplifies a network quarantine system and a network having a different connection mode.

FIG. 8 exemplifies a case in which a network quarantine system and a network include a different connection mode. A packet of a PC-B 807 connected in an unauthorized manner is directed by use of APR information so as to flow into a third network interface 813, and thus, the connection is controlled by discarding or the like the packet of the PC-B 807 connected in an unauthorized manner by the third network interface 813. Furthermore, when a terminal device PC-C 808 in violation of security settings attempts to be connected to a server or a PC terminal other than a server B 805 for downloading a security patch, the packet is preferably directed to flow into the third network interface 813. In the case of FIG. 8, the packet data access controller 315 of FIG. 3 is operated as the third network interface 813. By employing this configuration, the packet of the third network interface 813 which performs the access control is separated from a packet of a first network interface 811 capturing a packet or transmitting ARP information, or a packet of a second network interface 812 controlling or the like the downloading of security data by a PC in violation of security settings. Thus, each of the functions of the network interfaces can be less likely susceptible to mutual transmission and reception of data.

The foregoing description of the embodiments of this invention has been presented for purposes of illustration and description. It is not intended to be exhaustive or to limit the invention to the precise form disclosed, and obviously, many modifications and variations are possible.

What is claimed is:

1. A method of controlling access to a network from a computer terminal, comprising:
   capturing a first packet from a switching hub by a first interface;
   determining whether the captured first packet is transmitted from a first terminal or a second terminal;
   in response to determining that the captured first packet is a security setting violation report packet transmitted from the first terminal, generating and sending a first address resolution protocol information, changing a first media access control address for a security patch download server of a first address resolution protocol table of the first terminal into a second media access control address of a second interface, and changing a third media access control address into the first media access control address;
   in response to determining that the captured first packet is a second address resolution protocol packet transmitted from the second terminal, generating and sending a second address resolution protocol information and changing a fourth media access control address of a second address resolution protocol table of the second terminal into the first media access control address;
   capturing a second packet at the second interface;
   determining whether the captured second packet at the second interface is related to a security patch of a first server;
   redirecting the captured second packet at the second interface related to the security patch of the first server without bandwidth control;
   determining whether the captured second packet at the second interface is related to a security patch of a second server;
   redirecting the captured second packet at the second interface related to the security patch of the second server with bandwidth control;
   discarding a captured second packet at the second interface unrelated to the security patch of the second server; and
   disposing the captured first packet from the first terminal and the second terminal that passes through the first interface,
   wherein the first terminal is a security setting violation terminal, and the second terminal is an illegal connection terminal.

2. The method according to claim 1, the method including:
   setting a different predetermined value to restrict the bandwidth for each server communicating with the first terminal;
   redirecting the captured second packet at the second interface related to the security patch of the first server with a forged connection destination; and
   discarding packet data from the second packet related to a security patch of the first server with a destination other than the first server.

3. A method of controlling access to a network from a computer terminal, comprising:
   capturing a first packet from a switching hub by a first interface;
   determining whether the captured first packet is transmitted from a first terminal or a second terminal;
   in response to determining that the captured first packet is a security setting violation report packet transmitted from the first terminal, generating and sending a first address resolution protocol information for changing a first media access control address for a security patch download server of the first address resolution protocol table of the first terminal into a second media access control address of a second interface, and for changing a third media access control address of the third interface into the first media access control address;
   in response to determining that the captured first packet is a second address resolution protocol packet transmitted from the second terminal according to the step of determination, generating and sending second address resolution protocol information for changing the second media access control address of the second address resolution protocol table of the second terminal into the third media access control address of the third interface;
   capturing a second packet at the second interface;
   determining whether the captured second packet at the second interface is related to a security patch of a first transmission control protocol port;
   redirecting the captured second packet at the second interface related to the security patch of the first transmission control protocol port without bandwidth control;

determining whether the captured second packet at the second interface is related to a security patch of a second transmission control protocol port;

redirecting the captured second packet at the second interface related to the security patch of the second transmission control protocol port with bandwidth control;

discarding a captured second packet at the second interface unrelated to the security patch of the second transmission control protocol port; and disposing the captured first packet from the first terminal and the second terminal that passes through the third interface, wherein the first terminal is a security setting violation terminal, and the second terminal is an illegal connection terminal.

\* \* \* \* \*